United States Patent
Hahn et al.

[15] 3,689,545
[45] Sept. 5, 1972

[54] PROCESS FOR THE PREPARATION OF TRIFLUOROACETYL FLUORIDE

[72] Inventors: Helmut Hahn; Siegfried Rebsdat, both of Frankfurt am Main, Germany

[73] Assignee: Farbwerke Hoechst Aktiengesellshaft vormals Meister Lucius & Bruning, Frankfurt/Main, Germany

[22] Filed: Feb. 17, 1969
[21] Appl. No.: 799,970

[30] Foreign Application Priority Data

March 2, 1968  Germany..........P 16 68 105.3

[52] U.S. Cl..............................260/544 F
[51] Int. Cl..............................C07c 51/58
[58] Field of Search...................260/544 F, 544 Y

[56] References Cited

OTHER PUBLICATIONS

Dmitriev et al., C.A. 53, 11211a (1959)
Belaventsev et al., C.A. 63, 17890c (1965)
Sokol' skii, C.A. 56, 7116g (1961)

*Primary Examiner*—Lorraine A. Weinberger
*Assistant Examiner*—Richard D. Kelly
*Attorney*—Connolly and Hutz

[57] ABSTRACT

Trifluoroacetyl fluoride is prepared by pyrolyzing the reaction products of tetrafluoroethane and sulfur trioxide, namely 3,3,4,4-tetrafluoro-2,2-dioxo-1,2-oxathietane, 4,4,5,5-tetrafluoro-2-oxo-1,3,2-dioxathiolane and 2-sulfofluorido-difluoroacetyl fluoride, in the presence of aluminum oxide or charcoal, as catalyst at a temperature of 50° to 240° C. The sulfur dioxide set free as a byproduct can be recycled after reoxidation to sulfur trioxide.

4 Claims, No Drawings

PROCESS FOR THE PREPARATION OF TRIFLUOROACETYL FLUORIDE

The present invention relates to an improved process for the preparation of trifluoroacetyl fluoride.

Trifluoroacetyl fluoride is a very reactive substance easily convertible into trifluoroacetic acid and derivatives thereof.

There are known several processes by which trifluoroacetyl fluoride can be prepared. For example, in U.S. Pat. No. 2,922,816, catalytic oxidation of tetrafluoro-ethylene with oxygen is described. However, the process provides low conversion rates of 3 to 15 percent and yields of up to about 75 percent only.

Moreover, it is known, to react tetrafluoroethylene with sulfur trioxide whereby 3,3,4,4-tetrafluoro-2,2-dioxo-1,2-oxathietane (I), 4,4,5,5-tetrafluoro-2-oxo-1,3,2-dioxathiolane (II) and 2- sulfofluorido-difluoroacetyl fluoride (III)

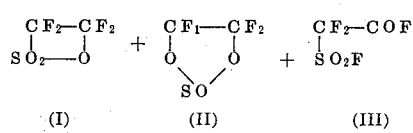

form as primary reaction products, and to convert the product I obtained in a major amount by treatment with triethyl amine into product III, from which trifluoroacetyl fluoride is obtained by thermal decomposition at 250° – 270° C (G.A. SSOKOLSKI and J.L. KNUNJANZ, (Izv, Akad, S.S.S.R. 9, 1655 – 1657 (1965)). However, this process is cumbersome and furnishes insatisfactory yields.

Now, it has been found that the preparation of trifluoroacetyl fluoride can be substantially simplified and carried out with good yield, particularly with operation at low temperatures, by heating 3,3,4,4-tetrafluoro-2-2-dioxo-1,2 oxa-thietane (I) or 4,4,5,5-tetrafluoro-2-oxo-1,3,2-dioxathio-lane (II) or 2-sulfofluorido-difluoroacetyl fluoride (III) or mixtures thereof to temperatures of from 50° to 240° C in the presence of catalysts. Thus, sulfur dioxide is formed which, after reoxidation to sulfur trioxide can be recycled into the process. For application as catalysts solid active substances are suited having a large surface, for example charcoal or aluminum oxide. The described operation permits to achieve good conversion rates and yields even at temperatures substantially below 100° C. The yields in trifluoroacetyl fluoride exceed 75 percent, referred to the tetrafluoro-ethylene used. It is likewise advantageous to use for pyrolysis mixtures of said primary products. As U.S. Pat. No. 3,163,656 discloses the reaction products of tetrafluoro-ethylene and sulfur trioxide form even at very elevated temperatures amounting to about 380° C or even more. Therefore, it was a most surprising phenomenon in regard to the thermal stability of these compounds that according to the present process they can be split under mild conditions and in a smooth reaction to form trifluoroacetyl fluoride in good yield.

The following examples are to illustrate the invention but they are not intended to limit it thereto. The parts and percentages are by weight unless otherwise stated.

EXAMPLE 1

To a stainless steel-2 l-autoclave equipped with a lifting agitator and an internal thermometer, a pyrolysis apparatus was connected likewise made of stainless steel and consisting of a tube with an internal diameter of 19 mm containing large-surface aluminum oxide of a grain diameter of 3 to 4 mm. The outlet of the tube was attached to a distillation flask cooled by a mixture of acetone and dry-ice forming part of a low-temperature distillation device.

Into the autoclave 116.3 g (1.455 mols) of freshly distilled sulfur trioxide were placed and the autoclave was pressurized with tetrafluoro-ethylene, while vigorously stirring, up to a pressure of from 5 to 6 kg /cm².

Since the occurring exothermic reaction causes a rise in temperature, the temperature was maintained at 70° C by aircooling.

In total 134 g (1.34 mols) of tetrafluoro-ethylene were fed at pressure into the autoclave and reacted therein. The reaction products were subsequently conducted via a valve into the pyrolysis apparatus while the autoclave was slightly heated so that its internal temperature attained 50° to 60° C. The pyrolysis was performed at 110° to 130° C. The reaction products formed were collected in the distillation flask by means of the freezing mixture and yielded after distillation 117 g of trifluoroacetyl fluoride (75 percent of the theory, referred to tetrafluoro-ethylene).

EXAMPLE 2

Into the pyrolysis apparatus described in Example 1 132 g (0.733 mol) of 2-sulfofluorido-difluoroacetyl fluoride (III) were introduced dropwise within 2½ hours through a side inlet tube and conducted over a mass of aluminum oxide having a large active surface in a length of 15 cm. The temperature at pyrolysis ranged from 70° to 90° C. The gases escaping at the outlet of the tube were condensed and distilled. Thus 65 g of trifluoroacetyl fluoride (76 percent of the theory) were obtained boiling at −59° to − 56° C at a pressure of 760 mm of mercury (Chem.Ber. 89. 862 (1956): −57° to − 58° C).

As by-products 38.5 g of sulfur dioxide and a distillation residue of 2.3 g had formed which indicated that the pyrolysis had been nearly quantitative.

For further identification the trifluoroacetyl fluoride was introduced into absolute ehtanol whereby trifluoro-acetic acid ethyl ester were obtained boiling at 61° – 62° C at a pressure of 760 mm of mercury (H.Gilman, R.G.Jones J.Am. Chem.Soc. 65, 1458 – 1460 (1941): 60°– 62° C).

EXAMPLE 3

Sulfofluorido-difluoroacetyl fluoride (III) was pyrolyzed according to the method of Example 1 with the exception that the pyrolysis proceeded at 150° - 180° C. With 94.5 g (0.525 mol) of sulfofluorido-difluoroacetyl fluoride (III) the yield was 48 g of trifluoroacetyl fluoride and 8 g of the starting compound were recovered (conversion rate 91.5 percent, yield 86 percent).

EXAMPLE 4

In the pyrolysis apparatus described in Example 1 162 g (0.9 mol) of 3,3,4,4-tetrafluoro-2,2-dioxo-1,2-oxathietane (I) were pyrolyzed at 160° – 170° C, whereby 76 g of trifluoro-acetyl fluoride were obtained beside 11 g of recovered starting compound which corresponds to a yield of 78 percent and a conversion rate of 93 percent.

Example 5

102 g (0.566 mol) of 3,3,4,4-tetrafluoro-2,2-dioxo-1,2-oxathietane (I) were subjected to the pyrolysis process described in Example 1 at which the reaction temperature ranged from 80° to 90° C. The distillation yielded 35 g of trifluoroacetyl fluoride and 34 g of unconverted starting compound. Thus the yield was 81 percent and the conversion rate 66 percent.

EXAMPLE 6

94.5 g (0.525 mol) of sulfofluorido-difluoroacetyl fluoride (III) were pyrolyzed in the presence of 20 ccm of charcoal of a grain diameter of 2.5 mm at 150° – 200° C in using the pyrolysis apparatus described in Example 1.

Work up of the reaction product yielded 61 g (68 percent) of trifluoroacetyl fluoride.

We claim:

1. In the process for the preparation of trifluoroacetyl fluoride from tetrafluoroethylene and sulfur trioxide the improvement consisting of pyrolyzing the primary reaction products of tetrafluoroethylene and sulfur trioxide at a temperature of 50° to 240° C in the presence of a catalyst having a large surface and selected from the group consisting of aluminum oxide and charcoal.

2. The process as claimed in claim 1, wherein a member of the group consisting of 3,3,4,4-tetrafluoro 2,2-dioxo-1,2-oxathietane, 4,4,5,5-tetrafluoro-2-oxo-1,3,2-dioxathiolane and 2-sulfofluorido-difluoroacetyl fluoride is pyrolyzed.

3. The process as claimed in claim 1, wherein a mixture consisting essentially of 3,3,4,4-tetrafluoro-2,2-dioxo-1,2-oxathietane, 4,4,5,5-tetrafluoro-2-oxo-1,3,2-dioxathiolane and 2-sulfofluorido-difluoroacetyl fluoride is pyrolyzed.

4. The process as claimed in claim 1, wherein the pyrolysis is performed at a temperature of 70° to 200° C.

* * * * *